324-77
CROSS REFERENCE
SEARCH ROOM
April 17, 1962 H. HURVITZ 3,030,168
MULTIPLE STYLUS RECORDER FOR ANALOG SIGNALS
Filed May 2, 1957
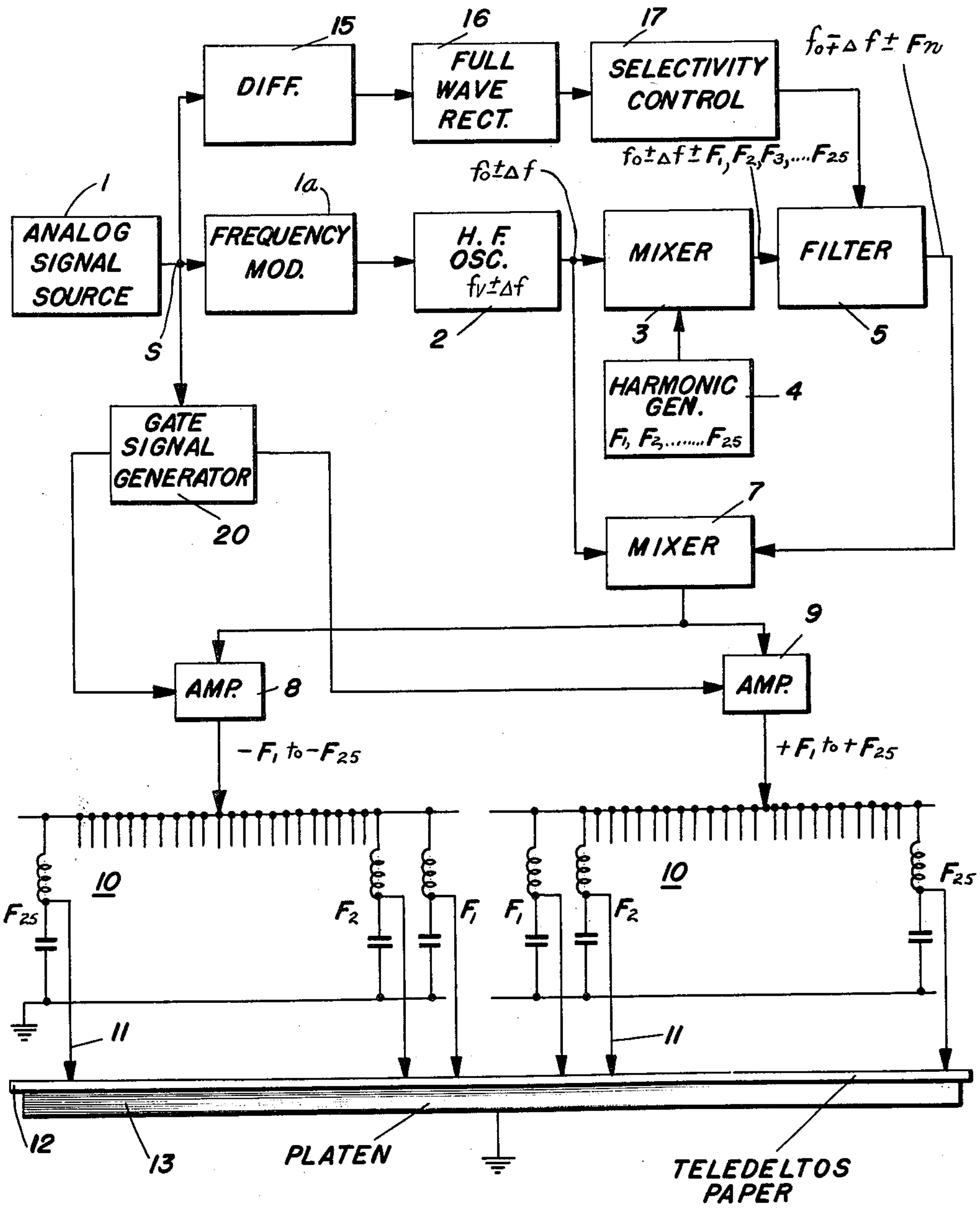
INVENTOR
Hyman Hurvitz
by Hurvitz & Rose
attys 3,030,168
Patented Apr. 17, 1962

3,030,168

MULTIPLE STYLUS RECORDER FOR ANALOG SIGNALS

Hyman Hurvitz, 1313 Juniper St. NW., Washington, D.C.

Filed May 2, 1957, Ser. No. 656,652
16 Claims. (Cl. 346—74)

The present invention relates generally to oscillographic recorders of the multiple stylus type, wherein each stylus is energized from a differently tuned filter, signal for the filters being produced by frequency modulating an oscillator in response to an amplitude varying signal which it is desired to record.

Systems of the general type described are known in the prior art, but possess serious disadvantages when employed for recording signals which vary in amplitude at a very high rate. Since the filters in the prior art systems are subjected to frequency modulated signals which sweep through the filters in succession, it is desirable to provide sufficient frequency separation between filters to reduce interaction between filters to an acceptable minimum. In general, a given signal will be of equal amplitude in two adjacent filters when at the cross-over point of the filters, and it is therefore desirable that the cross-over points be reduced in amplitude from the peaks by a factor of more than 50%. Moreover, the total time allocated to each filter response, during rapidly varying frequency modulated signal, may become small, i.e., of the order of five microseconds, so that the filters are required to have considerable pass bands. For a large number of filters the total frequency sweep of the system is then required to be very great, and the overall design of the required system becomes difficult of accomplishment because of the large number of design compromises which are involved, and because reliance is placed on the accuracy of tuning of a large number of filters, to accomplish accurate recording.

In accordance with the present system an amplitude varying signal is utilized to frequency modulate the output of an oscillator, and the latter output is applied to a mixer to which is also applied a considerable number of harmonic local oscillations. The output of the mixer consists then of a group of equally spaced frequencies as side bands of the frequency modulated signal, which are being frequency modulated in synchronism with the latter, so that they retain their spacings from the latter and from each other at all times. An intermediate frequency amplifier is connected to the mixer and is provided with a device for varying selectivity. For minimum selectivity the filter possesses a band width equal to the spacing between two adjacent harmonic local oscillations. Selectivity may be increased from that value, so that two, three, or more harmonic local oscillations may simultaneously pass through the I.F. amplifier, and the increase in selectivity is caused to be a function of the rate of change of the analog signal which is being recorded.

The output of the intermediate frequency amplifier is applied to a mixer, as is also the output of the frequency modulator. From the last-mentioned mixer can then be derived one local oscillator frequency, when the I.F. amplifier is adjusted for minimum selectivity and more than one local oscillator frequency for other settings. In general, the output of the second mixer consists of one or more of the harmonic local oscillations which were applied to the first mixer, and the specific local oscillator frequencies which become available are representative on a quantized basis, of the frequency of the frequency modulated oscillator, at all times.

The output of the second mixer is applied to an array of filters, each of which is tuned to a different one of the harmonic local oscillator frequencies, and each of which is connected to a different recording electrode of a multi-stylus recorder.

It follows that each harmonic local oscillator filter is not subjected to a frequency varying signal, but to a single constant frequency. The design requirements of the filters are, therefore, far less stringent than is the case in the prior art system above described. If the filters shift in frequency, as is commonly the case with changes of ambient conditions, and over time periods, the operation of the system is not materially affected. The sole critical filter in the system is the intermediate frequency amplifier, and since this constitutes one filter, whereas from 50 to 100 stylus filters may be employed, the problem of adjustment of the system for proper operation is radically reduced.

Moreover, the total time for which signal is applied to a stylus filter is a function of the width of the I.F. filter. For slowly varying analog signals to be recorded, the I.F. filter may be narrow, and may pass one harmonic local oscillator frequency at a time. As the rate of recording increases, the I.F. amplifier band width is increased and thereby not only does the I.F. amplifier become capable of responding to the rapidly frequency modulated signals applied thereto, but the total time during which any given harmonic local oscillator frequency is applied to a stylus filter is also increased. It follows that the stylus filters need not have excessively wide band widths, but that rapid operation may be obtained by increasing I.F. band width alone.

Moreover, the harmonic local oscillator frequencies may extend from some quite low value to some desired upper value, while the frequency modulated local oscillator may have a far higher value than the latter. For example, if 100 styli are employed, the harmonic local oscillator frequencies employed may be 10, 20, 30 . . . 1000 kc. At the same time the frequency modulated oscillator may have a frequency of 25 megacycles, for example, and require a total sweep of only plus or minus ½ megacycle. If an array of 50 stylus filters is selected, each to have a band width of 50 kc. so that the array of filters requires 25 megacycles, the frequency modulated oscillator may have a mean frequency of 10 megacycles, and a percentage deviation which remains relatively small and readily accomplished. The stylus filters do not then require Q values which are not readily obtainable with conventional elements nor do they require extremely accurate design. For example, a band width of 50K at 2.5 mc. requires a Q of only 50.

It is, accordingly, a broad object of the present invention to provide a system of oscillographic recorders employing multiple styli and electro-sensitive paper in which design parameters are readily obtainable, and in which problems of retaining filter performance over long time periods and under stringent operating conditions is minimized.

The above and still further objects, features and advantages of the present invention will become apparent upon consideration of the following detailed description of one specific embodiment thereof, especially when taken in conjunction with the accompanying drawings, wherein:

The single FIGURE of the drawings is a block diagram of the system.

Referring now more particularly to the accompanying drawings, the reference numeral 1 denotes a source of analog voltage S, or of amplitude varying voltage, having both positive and negative excursions, or either alone. The signal supplied by source 1 is applied to a frequency modulator 1*a* to frequency modulate an F.M. oscillator 2, with center frequency $f$ and with excursions $\Delta f$ proportional to the amplitude of the signal. The frequency modulated signal $f \pm \Delta f$ is amplitude modulated with a plurality of equally spaced frequencies F1, F2, F3 . . ., from a source 4 of multiple signals separated by a value $\Delta F$. The output of the mixer is then $(f \pm \Delta f) \pm F1, F2, F3$ . . . . The frequencies F1, F2, F3 are side-band frequencies which retain their spacing from each other and from $f$ while $f$ varies. Since both upper and lower side-bands are generated only 25 values of F are required for 50 styli.

At the output of the mixer 3 is a filter 5, having a band-width about $\Delta F$ and a center frequency $f$. The output of filter 5 and the output of oscillator 2 are applied to a second mixer 7, the output of which issues to amplifiers 8 and 9, in parallel, each having a band-width adequate to pass the entire gamut of frequencies F1, F2 . . . . Each of the amplifiers 8 and 9 issues to a series of filters 10, all in parallel, the filters of each series being tuned to different one of the frequencies $F1$, F2 . . ., and the filters are connected to styli or electrodes 11, one for one. The electrodes are arranged in an ordered array transversely of a sheet of electro-sensitive recording medium, 12, which is time fed over a grounded conductive platen 13.

Connected to the source 1 is a differentiating circuit 15, the output of which is applied to a full wave rectifier 16, and the output of the latter to a selectivity control circuit, 17, for increasing the band-width of filter 5, in a manner taught in U.S. Patent No. 2,661,419, to Tongue. The differentiating circuit produces a voltage proportional to the rate of change of the analog voltage, and the rectifier assures control voltage of the same polarity whether the analog signal is increasing or decreasing.

A suitable value for $f$ is 10 mc. and a suitable value for band-width for the filters is 50 kc., for 50 styli. The stylus filters need not be 50 kc. apart, but $\Delta F$ may be about 25 kc. or 30 kc., so that the total sweep of $f$ may be a maximum of $\pm 1.25$ mc. or less, say .75 mc. The assumption of a 25 or 30 kc. separation value for the stylus filters implies that the peak value of one filter is superposed well above the half power point of the adjacent filters. However, if desired, separation of 50 kc. may be employed.

The amplifiers 8 and 9 are gated in alternation in response to gating device 20, which senses whether the analog signal is positive or negative. If positive, an "ON" gating signal is supplied to amplifier 8 and if negative, "ON" gating signal is supplied to amplifier 9. The amplifiers are normally off.

In operation the analog signal provided by source varies the value of $f$ in alternate senses of duration, depending on the polarity of the analog signal, and in extent depending on its amplitude. The signal $f \pm \Delta f$ is mixed with local oscillations supplied by harmonic generator 4, so that there is supplied to the input of filter 5 a gamut of frequency varying signals $f \pm \Delta f \pm$ F1, F2 . . . . The filter 5 has a center frequency $f_0$ and a minimum band-width F2—F1, i.e., equal to the separation of the harmonic signals. Hence, the filter 5 selects a minimum of one side signal of the array $f_0 \pm \Delta f \pm F2$ at a time, as $f_0$ varies.

The value selected is precisely indicative of the amplitude of the analog signal but is itself devoid of polarity information.

When $f_0 \pm \Delta f$ is beat with $f_0 \pm \Delta f \pm F_n$ in mixer 7 there is derived the frequency $F_n$ which had been passed as a side band signal by filter 5, and this frequency is passed to amplifiers 8, 9. The signal is then gated via one of the amplifiers only, according to the polarity of the analog signal, and energizes one filter of one of the sets of filters, 10, according to its value.

The filters 10 are in two duplicate sets, one for positive analog signals and the other for negative.

Since their center frequencies are separated by $\Delta F$, starting at F1, the Q's of the filters may be quite low. Variation of the center frequencies of the filters over a relatively wide range does not then affect the operation of the system, which represents a feature thereof which is of primary importance.

For rapidly varying analog signals the width of filter 5 is increased to values of as high as 4 or 5 $\Delta F$, which lengthens the pulses applied to the stylus filters, and permits them to respond, and assures that each filter will produce a visible record.

For a value of $f_0 = 10$ mc. and for 50 styli and a 2000 cps. maximum analog signal, $\Delta F$ may equal 25 kc. In such case the time allotted to each filter, if the width of filter 5 is $\Delta F$, is only about 5 $\mu$s. This may be increased to 25 $\mu$s if the width of the filter is increased by a factor of 5, for example. A 50 kc. wide filter can then readily respond without appreciable ringing or overshoot. The Q values of the filters may be, for the F25 filter, about 25, which presents no fabrication difficulties.

In general, in order to avoid conversion products at the stylus filters 10 which do not derive from carrier $f_0$, the latter may be of high amplitude when applied to mixer 3 or mixer 7 and the harmonic signals may be of low amplitude.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A system for providing one of a plurality of fixed frequencies as a function of the amplitude of a control signal, comprising a source of a gamut of signals of spaced frequencies, means for translating said gamut of signals to a further gamut of signals of spaced frequencies having analog positions with respect to a reference frequency which is a continuous function of said amplitude, a band-pass filter for selecting at least one of said further gamut of signals, and means for frequency converting the selected signal to said one of a plurality of fixed frequencies.

2. A system comprising a plurality of electrodes arranged in circuit with a voltage sensitive medium, an array of filters each having a different frequency, a source of a plurality of frequency unvarying signals of equal frequency spacings, means coupling said filters one for one with said electrodes, said signals having frequencies corresponding one for one with the frequencies of said filters, a source of analog voltage, and means responsive to said analog voltage for applying said signals to said filters selectively as a function of the instantaneous amplitude of said analog voltage.

3. In combination, a source of an amplitude varying analog voltage, a source of high frequency oscillations, means for frequency modulating said oscillations in response to said analog voltage to provide a frequency modulated signal representative of said analog voltage, a first mixer, a source of harmonic local oscillations, means for applying said frequency modulating signal and said harmonic local oscillations to said first mixer, a filter coupled to said first mixer, said filter tuned to the unmodulated frequency of said frequency modulated signal and having a bandwidth at least equal to the frequency separation of adjacent ones of said harmonic local oscillations, a second mixer, means for applying to said second mixer the output of said filter and said frequency modulated signal, means for amplifying the output of said second mixer, a plurality of filters connected to be energized in parallel by said means for amplifying, each of said plurality of filters tuned to the frequency of a different one of said harmonic local oscillations, and a plurality of writing styli each coupled to a different one of said filters.

4. A source of analog voltage, means responsive to said analog voltage for providing a frequency modulated signal the instantaneous frequency of which is a continuous function of the amplitude of said analog voltage, means for modulating said signal with a gamut of side-bands extending at equal spacings both above and below the instantaneous frequency of said signal, means for selecting a small number of adjacent ones of said side-bands comprising a filter, means for mixing the selected ones of said side-bands with said signal to drive difference frequencies representative of the side-bands selected by said means for selecting, two sets of duplicate filters coupled to said means for mixing, each pair of duplicate filters being tuned to a different one of said difference frequencies, a first array of recording electrodes connected to one of said two sets of duplicate filters, and a second array of recording electrodes connected to the other of said two sets of duplicate filters.

5. The combination according to claim 4, wherein said two arrays of electrodes extend in opposite directions from a reference point, and wherein the filters severally connected to said electrodes are of increasing frequency as the electrodes depart from said reference point, and wherein is provided means for energizing said arrays of electrodes selectively according as said analog voltage is positive or negative.

6. A system comprising a plurality of channels, an array of filters each having a different frequency, a source of a plurality of frequency unvarying signals of equal frequency spacings, means coupling said filters one for one with said channels, said signals having frequencies corresponding one for one with the frequencies of said filters, a source of analog voltage, and means responsive to said analog voltage for applying said signals to said filters selectively as a function of the instantaneous amplitude of said analog voltage.

7. In combination, a source of an amplitude varying voltage, a source of high frequency oscillations, means for frequency modulating said oscillations in response to said analog voltage to provide a frequency modulated signal representative of said analog voltage, a first mixer, a source of harmonic local oscillations, means for applying said frequency modulating signal and said harmonic local oscillations to said first mixer, a filter coupled to said first mixer, said filter tuned to the unmodulated frequency of said frequency modulated signal and having a bandwidth at least equal to the frequency separation of adjacent ones of said harmonic local oscillations, a second mixer, means for applying to said second mixer the output of said filter and said frequency modulated signal, means for amplifying the output of said second mixer, a plurality of filters connected to be energized in parallel by said means for amplifying each of said plurality of filters tuned to the frequency of a different one of said harmonic local oscillations, and a plurality of channels each coupled to a different one of said filters.

8. In combination, a source of an amplitude varying analog voltage, a source of high frequency oscillations, means for frequency modulating said oscillations in response to said analog voltage to provide a frequency modulated signal representative of said analog voltage, a first mixer, a source of harmonic local oscillations, means for applying said frequency modulating signal and said harmonic local oscillations to said first mixer, a filter coupled to said first mixer, said filter tuned to the unmodulated frequency of said frequency modulated signal and having a bandwidth at least equal to the frequency separation of adjacent ones of said harmonic local oscillations, a second mixer, means for applying to said second mixer the output of said filter and said frequency modulated signal, a plurality of filters connected to be energized in parallel by said second mixer, each of said plurality of filters tuned to the frequency of a different one of said harmonic local oscillations, and a plurality of channels each coupled to a different one of said filters.

9. A system of quantized frequency modulation, including a source of amplitude varying analog signal, means for converting said amplitude varying analog signal to a frequency modulated carrier of corresponding information content, means comprising a first mixer responsive to said frequency modulated carrier for generating plural frequency modulated carriers of equal frequency spacings and each conveying said information content, and mixer means responsive to said plural frequency modulated carriers and to said first mentioned frequency modulated carrier for selectively generating signals of fixed frequency representative each in respect to its frequency of a different range of amplitude values of said amplitude varying analog signal.

10. In combination, a source of frequency modulated wave, means comprising a first frequency converter responsive to said frequency modulated wave for converting said frequency modulated wave to plural frequency modulated carriers of constant frequency spacings, and a second frequency converter responsive to said frequency modulated wave and to said plural frequency modulated carriers for selectively generating a gamut of different fixed frequencies each representative in respect to its frequency of a different small range of instantaneous frequency values of said frequency modulated wave.

11. In combination, a source of frequency modulated carrier of frequency $f_0$ having frequency deviations $\Delta f$, a heterodyne mixer connected to said source, a source of a plurality of local oscillations coupled to said mixer, said local oscillations having severally different frequencies arranged in an ordered array separated by frequency difference $\Delta F$, an intermediate frequency filter coupled to said mixer for deriving from said mixer heterodyne products of said frequency modulated carrier and said local oscillations, the pass band of said filter being of width approximately $\Delta F$ and having a value arranged to accept conversion products of said frequency modulated carriers with said plurality of local oscillations taken in succession.

12. The combination according to claim 11 wherein is further provided heterodyne means for mixing the output of said filter with said frequency modulated wave.

13. In combination, a source of frequency modulated wave having relatively wide deviation, means for converting said frequency modulated wave to a relatively small deviation frequency modulated signal repetitively passing through said small deviation as said frequency modulated wave passes through said wide deviation, said means for converting consisting of a single mixer and a source of plural local oscillations simultaneously applied to said single mixer.

14. The combination according to claim 13 wherein is further provided means for converting said frequency modulated signals to constant frequency signals.

15. In combination, a source of a variable amplitude signal, means for converting said variable amplitude signal to a frequency modulated carrier of the same information content as said variable amplitude signal, said frequency modulated carrier having frequency deviation $\Delta f$, a frequency converter, a source of plural local oscillations having frequency separations $\Delta F$ in pairs smaller than $\Delta f$ by a factor of at least three, means for applying said frequency modulated carrier and said local oscillations to said frequency converter for frequency conversion thereby, and an intermediate frequency band pass filter coupled to said frequency converter, said band pass filter having a band pass arranged to pass in succession the products of frequency conversion of said frequency modulated carrier and of said local oscillations as said frequency modulated carrier deviates through $\Delta f$.

16. The combination according to claim 15 wherein is further provided frequency converter means for mixing said frequency modulated carrier with the responses of said band pass filter to recover the frequencies of said local oscillations as said frequency modulated carrier deviates through $\Delta f$.

References Cited in the file of this patent

UNITED STATES PATENTS

| | | |
|---|---|---|
| 2,151,091 | Dudley | Mar. 21, 1939 |
| 2,525,679 | Hurvitz | Oct. 10, 1950 |
| 2,602,836 | Foster | July 8, 1952 |
| 2,738,462 | Troxel | Mar. 13, 1956 |
| 2,779,654 | Williamson | Jan. 29, 1957 |
| 2,787,764 | Bjorkman | Apr. 2, 1957 |